May 24, 1955   W. H. ARMACOST ET AL   2,708,981
APPARATUS AND METHOD FOR SECURING PURIFIED AND DRIED STEAM
Filed Aug. 1, 1952   4 Sheets-Sheet 1
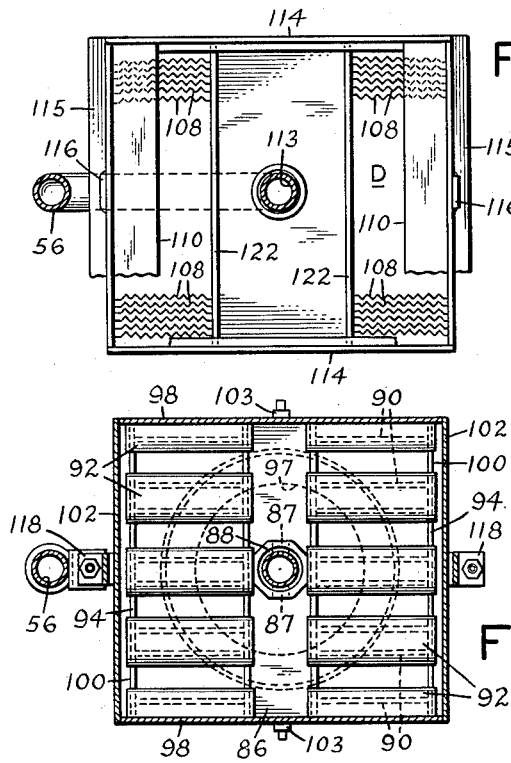
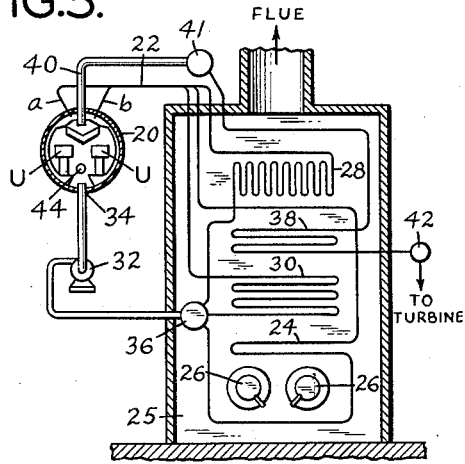
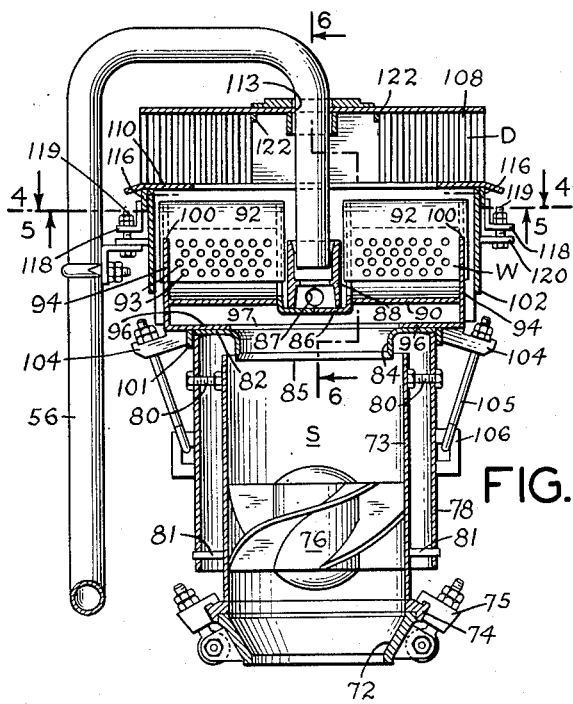
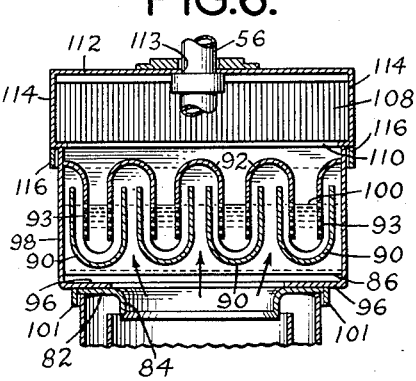
INVENTORS.
WILBUR H. ARMACOST
ALBERT R. MUMFORD
CLARENCE W. WEHMEYER
WALTER H. KUTSCHALE
BY
ATTORNEY.

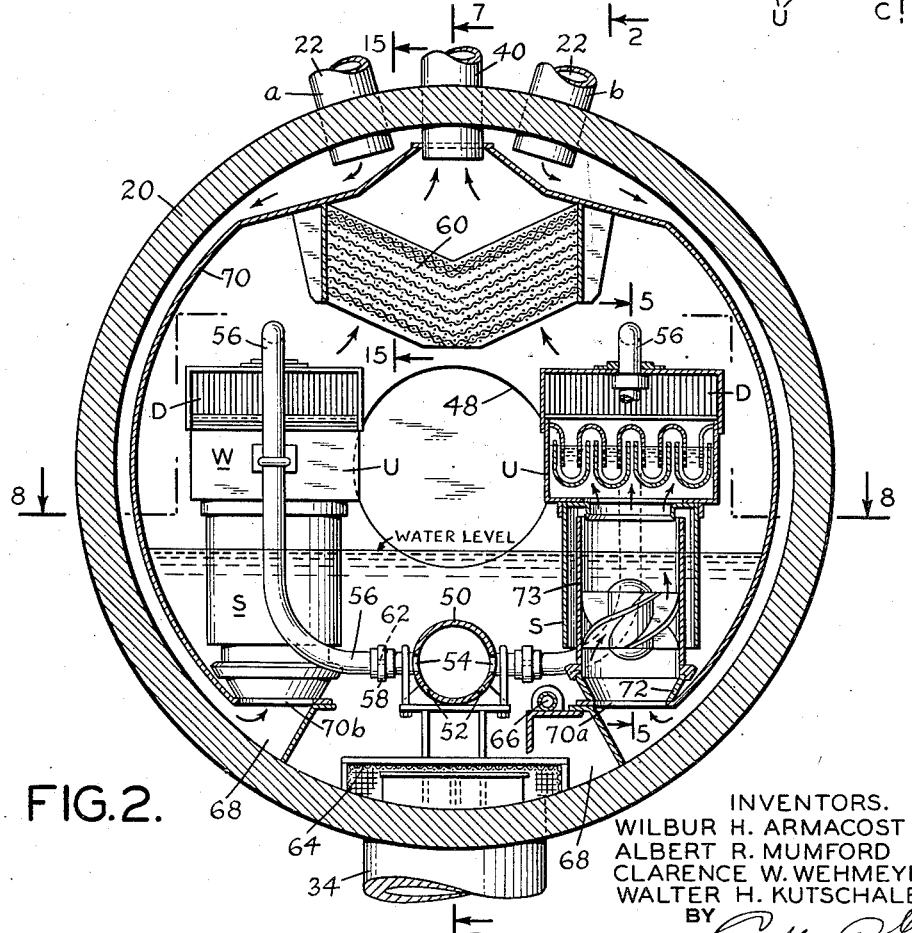

May 24, 1955
W. H. ARMACOST ET AL
2,708,981
APPARATUS AND METHOD FOR SECURING PURIFIED AND DRIED STEAM
Filed Aug. 1, 1952
4 Sheets-Sheet 3
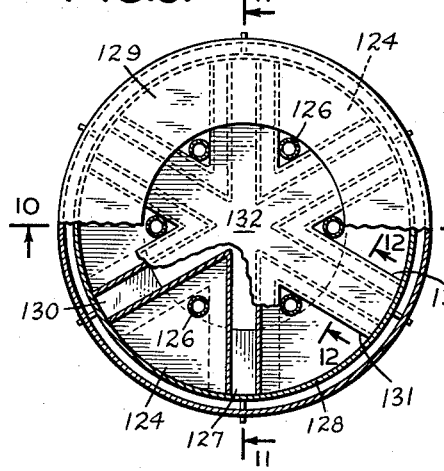
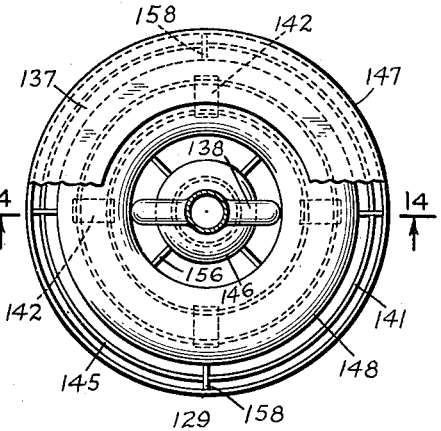
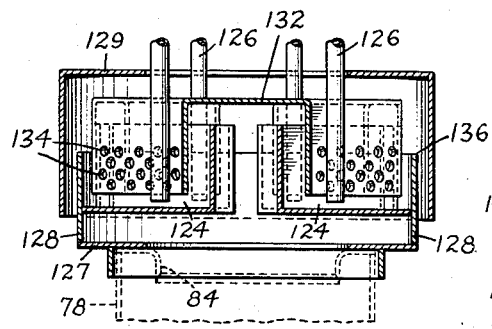
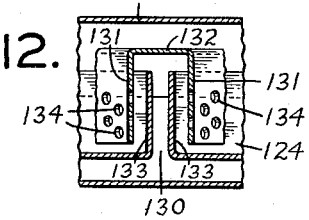
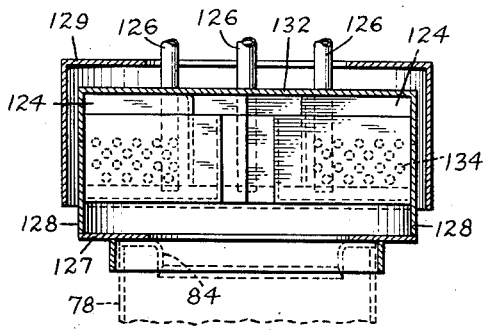
INVENTORS.
WILBUR H. ARMACOST
ALBERT R. MUMFORD
CLARENCE W. WEHMEYER
WALTER H. KUTSCHALE
BY
ATTORNEY.

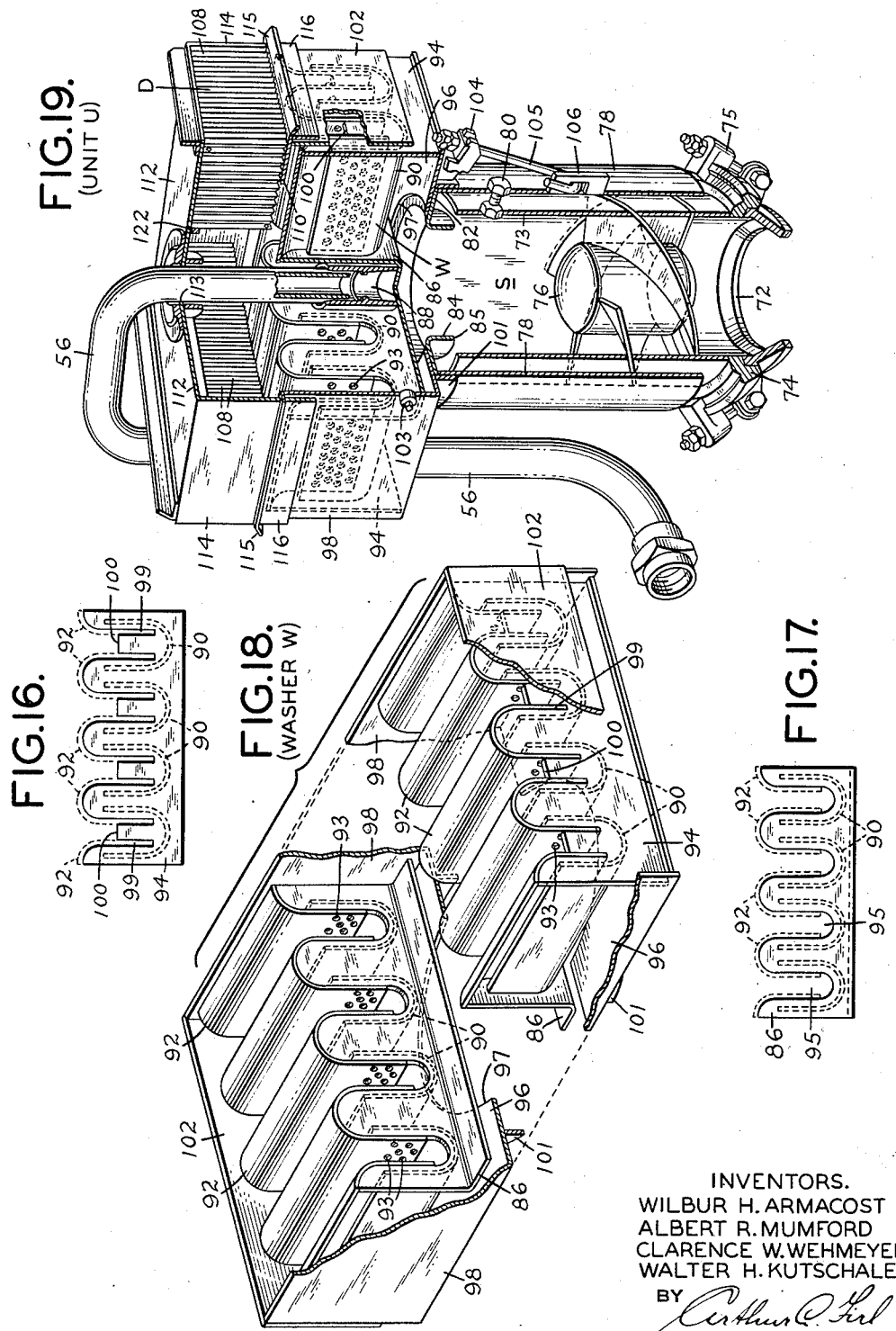

United States Patent Office 2,708,981
Patented May 24, 1955

2,708,981

APPARATUS AND METHOD FOR SECURING PURIFIED AND DRIED STEAM

Wilbur H. Armacost, Scarsdale, N. Y., Albert R. Mumford, Bogota, N. J., Clarence W. Wehmeyer, White Plains, N. Y., and Walter H. Kutschale, Tenafly, N. J., assignors to Combustion Engineering, Inc., New York, N. Y., a corporation of Delaware Application August 1, 1952, Serial No. 302,268

10 Claims. (Cl. 183—22)

This invention relates to equipment for securing purified and dried steam from a mixture of steam and water taken from the vaporizing surfaces of steam boilers, and is specifically concerned with a steam purifying method and apparatus as is installed in the steam and water drum of a steam generator operating under high pressure, such as 1500 p. s. i. and over.

It is the primary object of our invention to provide a self contained apparatus within the drum for removing or reducing the amount of silica vapor and other condensable gases from the steam before superheating.

Another object of the invention is the provision of a self contained apparatus within the drum for effectively removing or reducing the solid impurities in solution in the moisture suspended in the steam when operating under high pressures where the density of the water approaches that of the steam.

An additional object of our invention is the removal of silica both in solution and vapor form as well as other impurities from the steam by the use of an improved apparatus providing steam washing in two stages.

A further object of our invention is the employment of a steam washing process operating under the counterflow principle.

A still further object of our invention is the elimination of a water separating drum and a dry drum by providing a self contained steam purifying apparatus installed in a single steam and water drum.

Additional objects and advantages will become apparent from the following description of illustrative embodiments of the invention when read in conjunction with the accompanying drawings wherein:

Figure 1 is a simplified schematic representation (in the nature of a vertical section) of a steam generating installation that has a steam and water drum equipped with the improved drum internal apparatus herein disclosed;

Figure 2 is a transverse section of the steam and water drum and internal apparatus as constructed in accordance with one embodiment of the invention;

Figure 3 is an enlarged sectional representation of one of the steam purifying units comprised by the apparatus of Figure 2;

Figure 4 is a plan view taken on line 4—4 of Figure 3;

Figure 5 is a transverse sectional view taken on line 5—5 of Figure 3;

Figure 6 is a vertical partial section taken on line 6—6 of Figure 3;

Figure 7 is a longitudinal partial section (to reduced scale) of the left hand portion of the drum internal apparatus taken on line 7—7 of Figure 2 and showing a plurality of the Figure 3 units arranged in a row side by side;

Figure 8 is a partial plan section of the left hand portion of the drum internal apparatus (to reduced scale) taken on line 8—8 of Figure 2 and showing two rows of the steam purifying units of Figure 3 as installed in the drum.

In Figures 7 and 8 only the left hand portion of the drum is shown since the drum and its internal apparatus is essentially symmetrical about center line C—C.

Figure 9 is a plan view of a modification of the second washing stage of our drum internal apparatus, part of which is shown broken away;

Figure 10 is an elevational section on line 10—10 of Figure 9;

Figure 11 is an elevational section taken on line 11—11 of Figure 9 said section taken in a plane positioned at right angle to the plane in which section 10—10 is taken;

Figure 12 is a partial upright section taken on line 12—12 of Figure 9;

Figure 13 is a plan view of another modification of the second washing stage of our inventive apparatus;

Figure 14 is an elevational section taken on line 14—14 of Fig. 13;

Figure 15 is a fractional, longitudinal section of the drum diagrammatically represented to reduced scale and taken on line 15—15 of Figure 2;

Figure 16 is a side elevation of plate 94 of the washing stage illustrated in Figures 4 and 6;

Figure 17 is a side elevation of trough 86 of the washing stage illustrated in Figures 4 and 6;

Figure 18 shows an isometric exploded view of the principal portions of the second washing stage W of our improved steam purifying apparatus illustrated by Figures 3, 4 and 6; and Figure 19 is a perspective view of the preferred embodiment of our steam purifying apparatus illustrated by Figure 3 with one quarter portion cut away for increased clarity.

The steam generator of Figure 1

The drum internal apparatus of our invention is especially well adapted for use on forced circulation and natural circulation steam generators operating under the high pressures required in modern steam generation practice. Our invention may advantageously be employed also in connection with steam boilers operating under lower pressures for the purpose of obtaining a high degree of steam purity. Moreover, our invention can be used to advantage for this purpose in boilers of a wide variety of types (marine, stationary or others), steam pressures and capacities. Illustrative of these is the steam generator shown in Figure 1.

In this apparatus steam and water mixtures are discharged at high velocity into drum 20 from vapor tubes 22 arranged in any suitable number of rows along the outer drum surface. There are two of such rows shown in Figs. 1 and 2, row a and row b. Each of these rows extends lengthwise of the drum and contains a plurality of similar tubes (see Fig. 15).

The tubes 22 are fed from a primary vaporizing circuit 24 constituting the side walls, floor and roof of the combustion chamber 25 fired by burners 26, and are in addition fed from a secondary vaporizing circuit 28 positioned at a somewhat higher elevation in the boiler furnace, and a third vaporizing circuit 30 which lines the combustion chamber wall (not shown) opposite the burners 26.

The illustrative boiler furnace of Fig. 1 is further provided with a forced circulation pump 32 for passing the water from the drum's bottom discharge outlet 34 into a main distributing header 36 and thence to the three vaporizing circuits 24, 28 and 30 earlier named. It is of course understood that any number of vaporizing circuits can be used in connection with our invention.

A superheater 38 is also provided in the combustion chamber 25. Saturated steam is discharged into drum 20, as earlier described, leaves by way of top outlet 40 to enter superheater inlet header 41, thence passes through superheater 38 to have its temperature raised before entering superheater outlet header 42.

The steam generator of Fig. 1 is also equipped with an inlet water connection 44 through which boiler feed water is admitted into drum 20 in the manner later to be described.

To lay a basis for subsequent description it will be assumed that this steam generator of Fig. 1 is designed to operate at a pressure of 1775 pounds per square inch; also that its three vaporizing circuits 24, 28 and 30 are jointly capable of generating steam and passing same through tubes 22 into steam and water drum 20 at rates in the neighborhood of 800,000 pounds of steam per hour.

As the description hereof proceeds it will become apparent that our improved steam purifying apparatus may with comparable benefit also be used with steam generators of either higher or lower capacities and/or pressures and with a wide variety of other types and designs which employ natural as well as forced circulation of the water being vaporized.

The steam and water drum 20

In the illustrative steam generator of Fig. 1 the steam and water drum 20 has an internal diameter of 54 inches and an approximate length of 40 feet between the drum ends. The steam outlet therefrom takes the form of a series of pipes 40 leading out of the drum top and arranged in a row along the drum's length (see Fig. 7). A normal water level is desirably maintained at a distance of 6 inches below the drum's horizontal center line (Fig. 2). The outlet 34 from the bottom of the drum takes the form of four downcomer pipes (two of which are shown in Fig. 7) leading out of the drum and acting in parallel to carry the drum-leaving water to pump 32 (one or more) for circulation through header 36 and boiler vaporizing circuits 24, 28 and 30 (see Fig. 1). The vapor tubes 22 of drum-entering rows $a$ and $b$ have an inside diameter of three inches. The end manhole opening 48 has a diameter of 16 inches. Feed water under suitable pressure is admitted by way of connection 44 entering the drum through a suitable opening in the drum head as shown in Figs. 7 and 8.

As the description proceeds it will become apparent that the steam purifying improvements of our invention are not restricted to installations in drums of the dimensions and organizations just described but may with comparable benefit also be installed in steam and water drums of different dimensions, purposes and organizations.

The drum internals of Fig. 2

In the illustrative embodiment of our invention shown in Fig. 2 drum 20 has installed therewithin: (1) feed water distributing means which include the submerged pipe 50 perforated as at 52 along its length and having openings 54 in its sides to which connect pipes 56, one for each steam-separating-washing-drying unit U (within pipes 56 there is installed a suitable flow restricting device 58 which serves selectively to proportion the flow of feed water passing through perforations 52 and the flow of feed water for steam washing through openings 54, as desired); (2) steam-separating-washing-drying means which take the form of improved units U projecting out of the drum water in two lengthwise rows (see Fig. 8) along the drum interior and organized to act on the steam and water mixtures that enter the drum by way of vapor tubes 22; (3) drying screen 60 arranged below steam outlet 40 in the upper half of drum 20 and extending over a major length portion of the drum as shown in Figs. 7 and 15 for distributing and further drying the steam on its way from units U to outlet pipe 40 in the drum's top; (4) means for feeding chemicals to the drum water such as by pipes 66 (Fig. 2) which are connected to a chemical feed nozzle (not shown) generally located in the end of the drum.

The incoming feed water from connection 44 (one connection provided in each drum head) is conveyed by pipe 50 (see Figs. 2, 7 and 8) into the drum interior from either drum end, and distributed along the major portion of the length thereof. If fed from one end of the drum only, then that end of pipe 50 which is near the other drum end will be closed by any well known means. Some of the water entering the drum by way of feed pipe 50 passes through perforations 52 into the main body of the drum water submerging the pipe. A predetermined other portion of the said water enters a plurality of pipes 56 through openings 54 and is discharged into the top of improved steam purifying unit U as hereinafter described. As stated hereinabove the water leaving pipe 50 through the above named openings 54 and perforations 52 is proportioned between said outlets by means of a flow throttling device 58 installed in each pipe 56. In the illustrative embodiments shown this throttling device 58 preferably includes a union carrying an orifice plate 62 having an orifice by which the flow of water through pipe 56 is limited to a predetermined amount.

For screening any large particles of matter out of the water that leaves the drum by way of the downtake pipes 34, each of those outlets has positioned around its opening top end a cylindrical screen 64 organized as shown in Fig. 2 to require the outlet-entering water (fed from pipe 50 plus discharge from steam purifying units U) first to pass through the openings in the screen 64.

Other equivalent means for diffusing the incoming feed water through the lower body of water contained in the drum are, of course, useable in combination with the improved steam purifying units U and final drying means 60 now to be described.

The improved self-contained purifying unit U

Single-drum boilers (as typified by Fig. 1) require very efficient and compact means to meet current demands for high steam pressures coupled with high steam purity. In such boilers steam and water mixture entering the drum from tubes 22 may consist of two to ten parts of water for each one part of steam by weight, but the steam delivered from the drum through outlet pipes 40 preferably should contain as little as two-tenths of one percent moisture or 0.002 part of water for each part of steam and in addition should be devoid of vapors such as silica vapor deleterious to economical operation of the steam turbines.

To provide steam of such dryness and purity the units U of Figs. 2 and 3 are novelly organized to accomplish in three separate stages the following four objectives: ($a$) breaking-up of steam bubbles and initial washing of steam; ($b$) primary separation of water from steam; ($c$) second washing of the separated steam in clean feed water causing absorption of condensable vapor; and ($d$) subsequent final drying. In obtaining the first two of the above objectives, use is made of centrifugal force as well as attrition to break up the foam. In the second stage or final primary washing stage use is made of intimately mixing the initially and partially dried steam with pure feed water thereby substituting relatively clean water for steam carried moisture, laden with impurities, and thereby also condense undesirable vapors such as silica vapor; and in the third stage drying is accomplished by combining centrifugal force with impact moisture separation.

As illustratively arranged in Fig. 2 the new steam purifying units U have upwardly passed therethrough from a compartment 68 all of the steam and water mixture that is delivered into the drum by tubes 22 (rows $a$ and $b$). Compartment 68 is inclosed by partition walls 70 which are organized around tubes 22 following curvature of the drum and extend along the entire tube-entering length thereof to isolate the enclosed compartment space from the remainder of the drum interior. A plurality of steam purifying units U constitute a right hand row mounted on and attached to a horizontal section 70a of division wall 70 while a plurality of other similar units U constituting a left hand row are supported in similar upright position on a horizontal section 70b of division wall 70.

It will be obvious that either a lesser or greater number of units U are useable than those illustrated, depending upon drum size and quantity of steam to be separated, washed and dried and that an arrangement of less or more than two rows is possible; in fact only a single unit may be found adequate in certain situations.

As here illustratively shown by Figs. 2 and 5 each of the units U comprises initial washing and separating stage S, final washing stage W and drying stage D.

A base or transition member 72 is mounted above each circular opening provided in plates 70a and 70b and of a conical shape with an upper diameter to match the pipe or tube 73 that is a component part of separating stage S.

The initial washing and separating stage S

Other parts comprising stage S include: a ring 74 attached to the lower end of tube 73, such as by welding, serving as a seat thereof, and being held in position by clamping devices 75 secured to base 72; a spinner 76 fixedly installed in the lower portion of tube 73, the outside diameter thereof being approximately 8½ inches; a tubular member or jacket 78 of larger diameter (here 10½ inches) than tube 73, organized as shown in concentric surrounding relationship with tube 73 supported thereon and spaced therefrom by bolts 80 and pins 81 (there being provided at least three bolts 80 and three pins 81 arranged around the circumference of tube 78), tube 78 being so positioned with respect to inner tube 73 that the outer tube's upper edge projects above that of the inner tube by approximately one inch; and attached to the upper end of tubular member 78 such as by welding a circular closure plate 82 having a concentrically positioned circular opening formed by a downwardly directed collar 84 of a diameter which is smaller than that of inner tube 73, said collar being radially spaced from the inner surface of tube 73 and having a lower edge 85 beveled on the inside thereof.

The steam and water mixture passing from compartment 68 upwardly through tube 73 is whirled by spinner 76 so that upon reaching the tube top the mixture rapidly swirls around the tube interior. The water content has a density from four to twenty or more times as great as the steam content, depending upon the mixture pressure, hence the heavier water thus acted upon by centrifugal force due to the whirling is concentrated near the wall of upright tube 73 while the lighter steam is concentrated toward the tube center. Reduced-diameter collar 84 projecting down into the upper end of tube 73 conducts this central concentration of steam directly up through the collar and at the same time allows the outer concentration of whirling water to pass outside of the collar, radially beneath circular closure plate 82 and downwardly along inner surface of jacket 78 into the drum space surrounding unit U, this outflowing water being directed into the main body of drum water.

Under certain conditions in the operation of high pressure boilers foam-over into the drum may occur which is caused by steam bubbles failing to burst upon reaching the liberating surface of the boiler water for reasons hereinafter brought out. These steam bubbles upon entering the spinner are violently agitated as the water and steam swirls about inside tube 73 which results in the bursting of the bubble film subjecting the liberated steam to an initial scrubbing and washing by the water subsequently separated from the steam as has been described hereinabove. This initial washing of the steam in conjunction with the breaking up of steam bubbles or foam is especially effective and desirable in reducing impurities concentrated in the steam when operating under high steam pressure such as 1500 pounds per square inch and over. This will become evident as the description hereof proceeds.

The final washing stage W

Directly above the closure plate 82 there is mounted the final washing stage W. A predetermined amount of feed water for washing the steam enters through feed pipe 56 as earlier described and is discharged centrally into a trough 86 through vertical openings 87 provided in sleeve 88 which acts as a seat and support for the lower end of tube 56. Trough 86 is formed of a U-shaped plate the sides of which are scalloped as shown in Fig. 17 to provide openings leading into a series of U-shaped trays 90 positioned along either side of trough 86. Trays 90 are arranged in parallel and spaced relation, four in a row on each side of trough 86 and perpendicular thereto. Above the pairs of adjacent upstanding sides of trays 90 there are positioned a series of inverted U-shaped hoods 92 extending longitudinally over the entire length of trays 90. The straight sides of hoods 92 are perforated such as by openings 93. The ends (of hoods 92) which face trough 86 are closed by the sides of the trough said sides being shaped as shown in Fig. 17. The other ends of hoods 92 are closed by end plate 94, said end plate being cut to the shape illustrated in Fig. 16. The ends of U-shaped trays 90 facing trough 88 are partially closed by the sides of trough 86 as shown in Figs. 6 and 17; openings 95 however are left open in the ends to provide a passage from the interior of trough 86 into each tray 90. As indicated in Fig. 3 end plates 94 extend downwardly beyond the bottom of trays 90 to fixedly join a bottom plate 96, such as by welding, said bottom plate having a centrally located circular opening 97 which matches that of closure plate 82 earlier described. There are also provided two side plates 98 one at each end of trough 86 and the hood and tray rows to enclose the whole washing assembly in a box-like structure. The hereinabove described components of the washer such as trough 86, trays 90, hoods 92, end plates 94, side plates 98 and bottom plate 96 are welded together to form a water tight structure as shown. In joining hoods 92 to end plates 94 (see Fig. 16) it will be noted that the downwardly extending legs of hood 92 fit into slots 99 provided for in end plate 94 leaving a portion of end plate 94 extending upwardly between adjacent hoods 92. This portion has an upper overflow edge 100 which is significant in determining the water level in the washer as will be described hereinafter. There are also provided two apron plates 102 one adjacent each end plate 94, spaced therefrom and parallel thereto. To the underside of bottom plate 96 there is attached, such as by welding, a downwardly extending circular flange 101 which slidably fits over the outside of closure plate 82 and tube 78 thereby acting as a positioning device for centrally locating the washer W on top of separator S. Two anchor lugs 104 fastened to the underside of bottom plate 96, such as by welding, serve to secure the washer W to separator S by means of eye bolts 105 and brackets 106 attached to outside of jacket 78. A plug 103 is provided at each end of feed trough 86 to permit drainage of the water during repair and inspection.

In operation, the wet steam having been subjected to intial washing and moisture separation in the previous stage S leaves that stage by way of collar 84 and rises between U-shaped trays 90 to enter the space provided below and under hoods 92. Feed water of low impurity concentration, having been discharged into trough 86 through pipe 56 as hereinbefore described also fills the interior of trays 90 to a height determined by overflow edge 100 (see Fig. 6). A continuous stream of wash water passes through trays 90 and spills over edge 100 to flow downwardly between apron 102 and end plate 94 into the main body of drum water. The steam which is trapped under hoods 92 and being under a higher pressure than the drum interior surrounding our steam purifying unit U depresses the water level under hoods 92, passes through openings 93, bubbles through a body of clean feed water flowing through trays 90 in a longitudinal direction, rises between hoods 92 and enters drying stage D.

While passing through the clean feed water in the manner just described any condensable vapors such as silica vapor contained in the steam will be absorbed by the clean wash water because of its low impurities concentration and the low vapor pressure of those impurities.

Furthermore the moisture still contained in the steam when entering the final washing stage having a higher concentration of impurities than the wash water will in effect give up a greater portion of these impurities to the wash water so that the steam now emerges from trays 90 having entrained therein moisture substantially as clean as the wash water or feed water.

The drying stage D

Directly on top of end plates 94 and side plates 98 there is positioned the drying stage D which comprises as its main components two stacks of closely spaced drying plates 108 spacedly arranged as shown in Fig. 5. Each stack rests on a bottom plate 110 having a width of about one-half of the length of each drying plate 108 thereby permitting the washed steam rising from the washer W to enter each stack from beneath as well as from the entrance side thereof. A closure plate 112 covers the two stacks as well as the space therebetween, said cover plate having a circular opening 113 for passage of feed pipe 56 therethrough. Two opposing side plates 114 close the ends of the drying assembly leaving the other two sides open for the steam to escape horizontally into the interior of the drum after having passed through the stack of drying plates 108. These plates are provided with vertical ridges or undulations the valleys of which catch a large portion of the moisture in the steam as the steam is forced to change direction rapidly as it passes therebetween, the separated moisture running down the valleys to drip off the outer edge 115 into the body of water in the drum and the lower edges of plates 108 into washer trays 90. Along the underside of each bottom plate 110 and also along the outer edge of the other two sides 114 of the drying stage there is welded thereto a downwardly extending flange 116 which serves as a positioning device for locating the dryer assembly D in its proper position with relation to the washer W. Bottom plate 110 is extended over the length of drying plates 108 to form drip-off edge 115. Angle brackets 118 welded to positioning flanges 116, bolts 119 and lugs 120 welded to apron plates 102 serve to removably support the dryer assembly D on top of the washer assembly W. Spacer bar 122 welded to the underside of each top plate 112 provides a stop for drying plates 108. The steam having passed through drying plates 108 enters the steam space of drum 20 on its way to steam outlet 40 in the top of the drum.

During high-load operation of a steam generating unit equipped with our steam purifying apparatus, when the carry-over of moisture from the vaporizing surfaces into the drum may be especially high, it will be desirable to subject the steam to a final drying treatment before the steam leaves drum 20 on its way to superheater 38. This is accomplished by means of drying screens 60 which are arranged just below the steam outlet 40 in the upper half of drum 20 as has been set forth herein at an earlier stage of the description.

Under certain operating conditions it may be found desirable to modify the washing apparatus as shown by Figs. 5, 6 and 7 so as to provide an arrangement of washing trays and hoods as illustratively shown in Figs. 9, 10 and 11, and Figs. 13 and 14.

The modified washer of Figs. 9, 10 and 11

Thus in the modification of Fig. 9, five triangularly formed trays 124, into which wash water is being discharged from pipe branches 126, take over the functions of both trough 86 and trays 90 of our preferred embodiment of the invention (shown in Fig. 7). Trays 124 are arranged radially in the form of pie sections inside a tube 128 which is supported by and joined to a circular bottom plate 127 so as to provide room for access of the rising steam to the alleys between adjacent trays 124. Directly above trays 124 but spaced therefrom is arranged a hood plate 132 having five radially and horizontally extending arms which are equipped with downwardly extending sides 131 thereby forming hoods over the pairs of upwardly extending and adjacently positioned side walls 133 of trays 124. The hood sides 131 are perforated by openings 134. The upper edge 136 of tubular member 128 is selectively positioned with respect to trays 124 and openings 134 so as thereby to determine the level of the wash water in trays 124 by serving as a spill-over edge. An outer cover plate 137 is provided having a tubular vertical portion surrounding tube 128 to serve as an apron guiding the overflow downwardly along the outer surface of tubular member 128 and also having a horizontal annular portion to guide the washed steam radially toward the circular opening provided therein.

In operation, a predetermined amount of feed water is being discharged from pipe 126 into triangular trays 124 from which it overflows over edge 136 downwardly along the outside surface of tubular member 128 into the main body of water. Steam having passed through the initial separating stage S as herein earlier described enters the space between bottom of tray 124 and supporting plate 129, thence passes upwardly into lanes 130 between adjacent sides of trays 124 and finally is trapped under hoods formed by plate 132 and side walls 131. Due to a higher pressure prevailing in the steam than in the drum space surrounding the steam washer the steam depresses the water level between walls 131 and 133 (see Fig. 12) and escapes through openings 134 in walls 131 by bubbling through the water flowing through trays 124 as hereinabove described. Before passing through the water the steam contains moisture of high impurity concentration as well as condensable vapors such as silica vapors. These are being diffused into the low concentration wash water by intimate contact therewith. Upon leaving the surface of the wash water in trays 124 the steam has thereby in effect substituted low concentration moisture for high concentration moisture. The purified steam rises above trays 124 and leaves the washer through the opening in cover plate 138 to enter the drying stage as earlier described in connection with our preferred embodiment of Fig. 7.

The modified washer of Figs. 13 and 14

In the modification of Fig. 14 another arrangement of washing trays and hoods is shown. There the clean wash water enters by way of pipe branches 138 (two here shown) and is discharged into a circular trough 140 having a U-shaped cross section (see Fig. 14) from which it flows through radially positioned ducts 142 leading into another circular trough 144 of larger diameter than trough 140 and concentric thereto and having a cross section the shape of a half U. A tubular member 145 forms the outer side wall of trough 144, the upper edge of the former serving as spill-over edge thereby limiting the water level in troughs 140 and 144. There is further provided an outer tubular member 147 radially spaced from tube 145, concentric thereto and acting as an apron which directs the spilled-over water downwardly into the main body of water. Straddling the upstanding sides of troughs 140 and 144 are cap 146 and annular hood 148 of inverted U-shaped cross section. The downwardly extending sides 150 of annular hood 148 and cap 146 are provided with perforations 152. At the lower portion of the aforesaid sides 150 there are provided slots 154 to facilitate ready distribution of water throughout troughs 140 and 144. Spacer bars 156 serve to maintain cap 140 in a position concentric to annular hood 148. There are also provided lugs 158 welded to inner surface of tubular member 147 and outer side of annular hood 148 to act as spacers and supports for member 147.

In operation a predetermined amount of feed water is being discharged from pipes 138 into inner annular trough 140 from which it flows through ducts 142 (four here shown) into outer annular trough 144 from which it overflows over the edge 141 and downwardly into the main body of water. Steam having passed through the initial separating stage S as herein earlier described enters the space below bottom of troughs 140 and 142 from where it rises into the space provided below cap 146 or under annular hood 148. The steam thus trapped under cap 146 and hood 148 depresses the water in annular space 160, by virtue of the higher pressure imparted to the steam than exists in the space surrounding the washer, until the steam enters openings 152 and bubbles through the wash water flowing through troughs 140 and 144. The same purifying action is thereby provided to cleanse the steam as herein earlier described and the purified steam passes upwardly into the dryer in the same manner earlier pointed out in connection with our preferred embodiment of the invention as shown by Figs. 5, 6, 7 and 8.

Having thus described our improved steam purifying apparatus in detail, an explanation as to why our apparatus succeeds where others fail, will be found desirable.

*The problem and the solution*

One of the problems with which the designers of modern high pressure, high temperature steam generating equipment is confronted resides in the elimination of the causes of turbine-blade deposits which create much trouble in the steam power plant. These deposits, by changing the contour of the blades, considerably reduce the performance efficiency of the turbine and cause frequent and costly power plant shut downs for cleaning and repairs.

In recent years, almost parallel with the increase in steam pressures, a new type of deposit appeared to be forming in steam turbines. When the upper limit of steam pressures was about 600 p. s. i., the deposits which formed were water-soluble and could readily be removed by a water wash. The average type of deposit was then mainly sodium salts such as chlorides, sulphates and silicates together with sodium hydroxide. Since the increase in steam pressures to 1500 p. s. i. and above and the installation of topping turbines, the type of deposit formed in the high pressure end of the topping turbine is similar to the older deposit types and is water soluble. However, at the low-pressure end of the topping unit and in the low-pressure machines, a deposit is formed which is unsoluble in water. This deposit consists mainly of silica ($SiO_2$) in its various crystalline forms. Elimination of this type of deposit is herein of primary importance.

It has been rather difficult to give a logical explanation of how the silica present in the boiler water as sodium silicate is transported through the high pressure turbine and deposited on the low pressure machines as crystalline silica.

Early investigators have presented experimental data which showed that silica could be vaporized from silicic acid in appreciable amounts at 100 atm. steam pressure which gave rise to the theory that silica vapor is present in the steam as it passes through the high pressure stages of the turbine to later condense and crystallize in the turbine blades of the low pressure stage. These early investigations also demonstrated that the silica in the steam increased with increasing silica concentration in the boiler water. Furthermore, it was found that the amount of silica in the steam increased with an increase in steam pressure.

More recent experiments in the laboratory and particularly field tests conducted on actual steam power installations confirmed the hereinabove mentioned earlier findings especially in regard to the amount of silica present in the steam at different pressures. Thus the data gathered during these tests indicate that there could be present twenty times as much silica in steam generated at 1540 p. s. i. as there would be found in steam generated at 680 p. s. i. with the same silica concentration prevailing in the boiler water in either case.

From this it can easily be seen why it is so important to keep the silica concentration low in high pressure boilers and why silica deposits are found on the low pressure stage turbine blades of high pressure machines.

More specifically the aforementioned tests conducted in power plants demonstrated that, when the silica concentration in the boiler water is kept below 5 p. p. m. (parts per million) and the pH value of the boiler water is around 11, no appreciable silica deposits are formed in the turbines; and if the silica concentration in the steam becomes greater than 0.1 p. p. m. deposit will form on the turbine blades.

The above indicates that, in order to prevent this type of deposit, it is essential to keep the amount of silica vapor in the steam very low. This may be accomplished either by maintaining the amount of silica in the boiler water at a safe limit or by removing the silica from the steam before superheating.

Our improved steam treating apparatus as herein earlier described is believed to successfully purify the steam by reducing to a safe limit silica and other impurities contained in the steam whether those impurities are present in vapor form or in solution.

Moreover such beneficial treatment of the steam is hereby accomplished in a single drum without the use of a water separating drum or a steam drying drum, and by means of one or more units U which are self-contained.

Although the question has not been fully explored, why our improved purifying apparatus performs so well under the most severe operating conditions imposed by a high pressure steam generator, a logical explanation can be found when comparing the nature of the film of steam bubbles formed at low pressure and that formed at high pressure.

It has been found by further experimentation and analysis that the amount of silica vapor which is in effect vaporized silicic acid originally entrained in the boiler water, depends but in a small measure on the amount of silica concentration in the water from which the steam is being evaporated and in a much larger measure on the degree of silica concentration prevailing in the film of the steam bubbles rising through the boiler water.

Therefore the amount of silica deposits on the turbine blades in the low pressure stage bears a direct proportional relationship to the amount of silica carried in the film of the steam bubbles passing through the boiler water on their way from the vaporizing surfaces.

Thus the troublesome silica deposits accumulating on low pressure stage turbine blades can be traced to the high silica concentration occurring on the film of steam bubbles when under high steam pressure, thereby increasing the strength of the film substantially and delaying the bursting of the steam bubble.

One of the principal reasons for the concentration of insoluble matter and chemicals to a greater extent in the film surrounding a bubble at high pressures than at low pressures is the difference in expansion ratio when water evaporates into steam.

Thus at a pressure of 150 p. s. i. a. (pounds per square inch absolute) the expansion ratio (volume of steam to volume of water of equal weight) is 167, whereas at 1500 p. s. i. a. the expansion ratio is 11.8 and at 2000 p. s. i. a. this ratio is 7.3.

On evaporation the dissolved and suspended matter in the water evaporated concentrates in the water film surrounding the steam bubble. The degree of concentration is proportional to the bubble surface assuming the same initial volume of water and the same film thickness.

Therefore the concentration in the film is much greater at higher pressures because of the lower expansion ratio.

The aforesaid increased film concentration of higher pressure steam bubbles has the effect of increasing the reaction rate of the dissolved matter in the film over that in the boiler water. Therefore the production of finely divided insolubles is great in this film and the concentration of suspended matter is high.

Furthermore the highly concentrated film reacts with substances in the boiler water as the bubble moves through the water towards the liberating surface thus producing finely divided insolubles in the film. These finely divided insolubles in the film absorb by surface absorption solubles from the boiler water thus further increasing the film concentration and its strength.

At the instant the bubble forms the concentration in the film around it is made up of the material in the water from which the bubble was formed plus the amount in the boiler water volume constituting the film. The film thickness in the first instant must be molecular but through chemical reaction among the constituents present, through reaction with chemicals contacted while the bubble is rising and through surface absorption by the freshly formed insolubles of soluble constituents in the boiler water contacted during the rise the film concentration may actually increase as the releasing surface is approached.

The aforesaid action applies to all pressures but are not important at low pressures because the initial film concentration may only be about 10% above that of the boiler water. At high pressures the film concentration increases rapidly at formation of the bubble and is therefore increasingly affected by the action of surface absorption while rising through the boiler water.

Experiments and analysis conducted with steam bubbles have shown that the higher the concentration of the dissolved and suspended matter in the bubble film, the stronger the film and the more difficult it is to burst the bubble. It follows therefore that the film of steam bubbles formed under high pressure conditions is exceedingly stronger than the film of bubbles formed under low pressure conditions.

As soon as the bubble reaches the releasing surface the bubble film starts to drain; i. e., the concentration becomes less and if given time will ultimately weaken the film to the point of rupture. The foam level (accumulation of bubbles on the surface) is controlled by the relative rate of bubble production to the rate of rupture. When the production rate is sufficiently higher than the rupture rate foam-over will occur.

Little drainage time is required to weaken the film to the point of rupture at low pressures because of the already weak and easily ruptured film. The strength of the high pressure film because of its high concentration requires excessive drainage time for weakening in economically available space. We have found that the weakening of the film to the rupture point is greatly accelerated by violent agitation with boiler water having relatively low concentration as compared to the film.

In the first washing and separation stage S of our improved steam purifying apparatus as herein earlier described the steam is subjected to such violent agitation in the presence of the circulating water entering the separator with the steam. Steam bubbles which are carried over from the evaporating surfaces are accordingly subjected to vigorous scrubbing along the surfaces of spinner 76 and tubular member 73. The film of the bubble is therefore weakened both by dilution of the suspended matter into the low concentration boiler water and physical destructive action by the spinner surfaces. Any foam that has not been absorbed in the first washing stage will be subjected to final weakened by dilution by almost pure feed water when passing through the second washing stage W wherein the remaining vestige of film is eliminated and the dissolved and suspended matter is returned to the boiler circulation.

It can be appreciated that greater dilution of the film is required at higher pressures because of the greater concentration in the film. Therefore agitation with less concentrated fluids must be more intense than at lower pressures.

With respect to silica vapors carried in the steam it has been found that exposing these vapors to feed water of low silica concentration establishes new equilibrium conditions for the silica vaporized from the dissolved silica in the boiler water and results in partial condensation of this vaporized silica reducing the amount to the safe limits hereinabove earlier mentioned during the discussion of undesirable silica deposits in the low pressure stage of high pressure steam turbines.

The highly efficient purification obtained by our drum internal apparatus when subjecting high pressure steam to its beneficial action is due in part to the fact that washing takes place according to counterflow principle.

Thus the steam is initially subjected to washing by the circulating water having relatively low concentration in the neighborhood of 1000 ppm. This washing takes place in initial washing and separating stage S and the impurities originally contained in the film of the steam bubbles are upon bursting absorbed by the circulating water which is subsequently separated from the steam and leaves the separator by way of annular opening between skim-off collar 84 and tubular member 73.

On the other hand the concentration of the steam in the second washing stage W being substantially lower than in the first stage is exposed to wash water of highest purity. This action takes place as the steam bubbles through clean wash water flowing through trays 90 of washer W.

From the aforesaid it can be appreciated why our improved steam purifying apparatus performs so efficiently in eliminating the high silica concentration of steam (both in solution as well as in vapor form) resulting from the generation of high temperature, high pressure steam.

*Other advantages connected with use of steam purifier U*

In addition to the outstanding effectiveness of our steam purifying apparatus in eliminating or reducing to a safe limit the silica vapors and other impurities in the steam when operating under high pressures, there are other advantages resulting from the use of our improved steam purifying apparatus in all types of boilers and operating under all pressures.

One advantage worthy of note is the considerable savings in first-costs which can be realized by elimination of either a water separation drum or a steam dry drum or both which is made possible by the utilization of our improved steam purifying apparatus as herein disclosed.

Other advantages reside in the compactness of our apparatus, ease of the erection thereof and facility of rapid replacement.

*Summary*

From the foregoing it will be seen that we have improved the design, extended the usefulness and bettered the performance of drum-internal apparatus for steam generators; that we have increased the purity of steam to acceptable standards for the operation of high pressure steam turbines by increasing the effectiveness of the reduction of silica vapor and other impurities in the steam; and that we have reduced the capital costs of a steam generator appreciably by reducing the number of drums required for acceptable steam dryness.

Our inventive improvements are accordingly capable of wide application and hence are not to be restricted to the specific forms here disclosed by way of illustration.

What we claim is:

1. In a method of purifying steam and destroying foam carried in steam and water mixtures received from the evaporation surfaces of a steam generator, the major portion of said mixture constituting recirculating water of medium solids concentration and the remaining portion constituting steam and foam formed by steam bubbles having a film of high solids concentration, the steps which comprise: (a) discharging said mixture of steam, water and foam into a single steam and water drum; (b) whirling said mixture at accelerated velocity through a spiral flow path within said drum whereby to break down the high concentration film of steam bubbles by diffusion of the solids in said film by the circulating water of medium solids concentration; (c) separating a major portion of said circulating water from said steam and water within said drum whereby to obtain a steam and water mixture of low water content; (d) passing said mixture of lower water content through a body of clean washing water within said drum in finely subdivided streams whereby the solids concentration of the steam and water mixture is still further reduced by diffusion into said clean wash water; and (e) removing by drying within said drum a substantial portion of the water in the thus obtained washed steam and water mixture.

2. In a method of purifying steam and destroying foam carried in steam and water mixtures received from the evaporation surfaces of a steam generator, the major portion of said mixture constituting recirculating water of medium solids concentration and the remaining portion constituting steam and foam formed by steam bubbles having a film of high solids concentration, the steps which comprise: (a) discharging said mixture of steam, water and foam into a single steam and water drum; (b) whirling said mixture at accelerated velocity through a spiral flow path within said drum whereby to break down the high concentration film of steam bubbles by diffusion of the solids in said film by the circulating water of medium solids concentration; (c) separating a major portion of said circulating water from said steam and water mixture within said drum whereby to obtain a steam and water mixture of low water content; and (d) passing said mixture of lower water content through a body of clean washing water within said drum in finely subdivided streams whereby the solids concentration of the steam and water mixture is still further reduced by diffusion into said clean wash water.

3. In a steam purifying apparatus comprising a steam and water drum having a steam outlet in the drum's upper portion and being provided with an upright partition dividing the drum interior into a first chamber which is adapted to receive incoming steam and water mixture and a second chamber which is separated from the first and which includes space for steam in the drum's upper portion communicating with said outlet together with an adjoining space in the drum's lower portion that is adapted to contain water, the combination of a generally upright separator tube communicating with the interior of said first chamber to convey steam and water mixture from the first chamber into said steam space, means in said separator tube for whirling the steam and water mixture upon upward passage through the tube whereby to break up any steam bubbles or foam that may be present and to separate a major portion of the water content against the tube wall for spilling over the wall's edge into said water space and to allow the whirling mixture thus freed of the separated water to flow further upwardly from the tube's central portion, a plurality of troughs being adapted to receive washing water from the outside of said drum and arranged spacedly from each other to form steam risers therebetween said steam risers communicating with the outlet of said tube to allow the steam issuing therefrom to flow through said steam risers, overflow means for maintaining a substantial body of washing water within said troughs, hoods spacedly arranged above said troughs and adapted to force the steam flowing through said risers substantially below the level of said water body said hoods having openings for dividing the steam into fine streams bubbling through said body of washing water, an outlet for the overflow of washing water into the water space of said second chamber, and means for discharging the washed and dried steam through said steam outlet.

4. In a steam purifying apparatus comprising a steam and water drum having a steam outlet in the drum's upper portion and being provided with an upright partition dividing the drum interior into a first chamber which is adapted to receive incoming steam and water mixture and a second chamber which is separated from the first and which includes space for steam in the drum's upper portion communicating with said outlet together with an adjoining space in the drum's lower portion that is adapted to contain water, the combination of a generally upright separator tube communicating with the interior of said first chamber to convey steam and water mixture from the first chamber into said steam space, means in said separator tube for whirling the steam and water mixture at accelerated velocity upon upward passage through the tube whereby to break up any steam bubbles or foam that may be present and to separate a major portion of the water content against the tube wall for spilling over the wall's top edge into said water space and to allow the whirling mixture thus freed of the separated water to flow further upwardly from the tube's central portion, a plurality of troughs being adapted to receive washing water from the outside of said drum and arranged spacedly from each other to form steam risers therebetween said steam risers communicating with the outlet of said tube to allow the steam issuing therefrom to flow through said steam risers, overflow means for maintaining a substantial body of washing water within said troughs, hoods spacedly arranged above said troughs and adapted to force the steam flowing through said risers substantially below the level of said water body said hoods having openings for dividing the steam into fine streams bubbling through said body of washing water, an outlet for the overflow of washing water into the water space of said second chamber and means for discharging the washed steam through said steam outlet.

5. In a steam purifying apparatus comprising a steam and water drum having a steam outlet in the drum's upper portion and being provided with an upright partition dividing the drum interior into a first chamber which is adapted to receive incoming steam and water mixture and a second chamber which is separated from the first and which includes space for steam in the drum's upper portion communicating with said outlet together with an adjoining space in the drum's lower portion that is adapted to contain water, the combination of a generally upright separator tube communicating with the interior of said first chamber to convey steam and water mixture from the first chamber into said steam space, means in said separator tube for whirling the steam and water mixture upon upward passage through the tube whereby to separate a major portion of the water content against the tube wall for spilling over the wall's top edge into said water space and to allow the whirling mixture thus freed of the separated water to flow further upwardly from the tube's central portion, a plurality of troughs being adapted to receive washing water from the outside of said drum and arranged in side by side and spaced relation to form steam risers therebetween said steam risers communicating with the outlet of said tube to allow the steam issuing therefrom to flow upwardly through said steam risers, overflow means for maintaining a substantial body of washing water within said troughs, a plurality of hoods spacedly arranged above said troughs in side by side and spaced relation having sides downwardly extending into said troughs and adapted to force said steam flowing through said risers substantially below the level of said water body the sides of said hoods being perforated to divide the steam into fine streams bubbling through said body of washing water, an outlet for the overflow of washing water into the water space of said second chamber and means for discharging the washed and dried steam through said steam outlet.

6. In a steam purifying apparatus comprising a steam and water drum having a steam outlet in the drum's upper portion and being provided with an upright partition dividing the drum interior into a first chamber which is adapted to receive incoming steam and water mixture and a second chamber which is separated from the first and which includes space for steam in the drum's upper portion communicating with said outlet together with an adjoining space in the drum's lower portion that is adapted to contain water, the combination of a generally upright separator tube communicating with the interior of said first chamber to convey steam and water mixture from the first chamber into said steam space, means in said separator tube for whirling the steam and water mixture upon upward passage through the tube whereby to separate a major portion of the water content against the tube wall for spilling over the wall's top edge into said water space and to allow the whirling mixture thus freed of the separated water to flow further upwardly from the tube's central portion, a plurality of troughs being adapted to receive washing water from the outside of said drum and arranged in side by side and spaced relation to form steam risers therebetween said steam risers communicating with the outlet of said tube to allow the steam issuing therefrom to flow upwardly through said steam risers, overflow means for maintaining a substantial body of washing water within said troughs, a plurality of hoods spacedly arranged above said troughs in side by side and spaced relation and having sides downwardly extending into said troughs and adapted to force said steam flowing through said risers substantially below the level of said water body, the sides of said hoods being perforated to divide the steam into fine streams bubbling through said body of washing water, an outlet for the overflow of washing water into the water space of said second chamber and means for discharging the washed steam through said steam outlet.

7. In a steam purifying apparatus comprising a steam and water drum having a steam outlet in the drum's upper portion and being provided with an upright partition dividing the drum interior into a first chamber which is adapted to receive incoming steam and water mixture and a second chamber which is separated from the first and which includes space for steam in the drum's upper portion communicating with said outlet together with an adjoining space in the drum's lower portion that is adapted to contain water, the combination of a generally upright separator tube communicating with the interior of said first chamber to convey steam and water mixture from the first chamber into said steam space, means in said separator tube for whirling the steam and water mixture upon upward passage through the tube whereby to separate a major portion of the water content against the tube wall for spilling over the wall's top edge into said water space and to allow the whirling mixture thus freed of the separated water to flow further upwardly from the tube's central portion, a plurality of troughs being adapted to receive washing water from the outside of said drum and radially arranged as are the spokes of a wheel for providing a space between one trough and the adjoining one to form steam risers therebetween said steam risers communicating with the outlet of said tube to allow the steam issuing therefrom to flow upwardly through said steam risers, overflow means for maintaining a substantial body of washing water within said troughs, a plurality of hoods radially arranged above said troughs and parallel thereto and having sides downwardly extending into said troughs and adapted to force said steam flowing through said risers substantially below the level of said water body the sides of said hoods being perforated to divide the steam into fine streams bubbling through said body of washing water, an outlet for the overflow of washing water into the water space of said second chamber, means for collecting and drying the washed steam in the drum's upper portion and means for discharging the washed and dried steam through said steam outlet.

8. In a steam purifying apparatus comprising a steam and water drum having a steam outlet in the drum's upper portion and being provided with an upright partition dividing the drum interior into a first chamber which is adapted to receive incoming steam and water mixture and a second chamber which is separated from the first and which includes space for steam in the drum's upper portion communicating with said outlet together with an adjoining space in the drum's lower portion that is adapted to contain water, the combination of a generally upright separator tube communicating with the interior of said first chamber to convey steam and water mixture from the first chamber into said steam space, means in said separator tube for whirling the steam and water mixture upon upward passage through the tube whereby to separate a major portion of the water content against the tube wall for spilling over the wall's top edge into said water space and to allow the whirling mixture thus freed of the separated water to flow further upwardly from the tube's central portion, a plurality of troughs being adapted to receive washing water from the outside of said drum and radially arranged as are the spokes of a wheel for providing a space between one trough and the adjacent one to form steam risers therebetween said steam risers communicating with the outlet of said tube to allow the steam issuing therefrom to flow upwardly through said steam risers, overflow means for maintaining a substantial body of washing water within said troughs, a plurality of hoods radially arranged above said troughs and parallel thereto and having sides downwardly extending into said troughs and adapted to force said steam flowing through said risers substantially below the level of said water body the sides of said hoods being perforated to divide the steam into fine streams bubbling through said body of washing water, an outlet for the overflow of washing water into the water space of said second chamber and means for discharging the washed steam through said steam outlet.

9. In a steam purifying apparatus comprising a steam and water drum having a steam outlet in the drum's upper portion and being provided with an upright partition dividing the drum interior into a first chamber which is adapted to receive incoming steam and water mixture and a second chamber which is separated from the first and which includes space for steam in the drum's upper portion communicating with said outlet together with an adjoining space in the drum's lower portion that is adapted to contain water, the combination of a generally upright separator tube communicating with the interior of said first chamber to convey steam and water mixture from the first chamber into said steam space, means in said separator tube for whirling the steam and water mixture upon upward passage through the tube whereby to separate a major portion of the water content against the tube wall for spilling over the wall's top edge into said water space and to allow the whirling mixture thus freed of the separated water to flow further upwardly from the tube's central portion, a plurality of annular troughs being adapted to receive washing water from the outside of said drum and arranged in substantially concentric and spaced relation to form steam risers therebetween said steam risers communicating with the outlet of said tube to allow the steam issuing therefrom to flow through said steam risers, overflow means for maintaining a substantial body of washing water within said troughs, a plurality of annular hoods spacedly arranged above said troughs and having sides downwardly extending into said troughs and adapted to force said steam flowing through said risers substantially below the level of said water body the sides of said hoods being perforated to divide the steam into fine streams bubbling through said body of washing water, an outlet for the overflow of washing water into the water space of said second chamber, means for collecting and drying the washed steam in the drum's upper portion and means for discharging the washed and dried steam through said steam outlet.

10. In a steam purifying apparatus comprising a steam and water drum having a steam outlet in the drum's upper portion and being provided with an upright partition dividing the drum interior into a first chamber which is adapted to receive incoming steam and water mixture and a second chamber which is separated from the first and which includes space for steam in the drum's upper portion communicating with said outlet together with an adjoining space in the drum's lower portion that is adapted to contain water, the combination of a generally upright separator tube communicating with the interior of said first chamber to convey steam and water mixture from the first chamber into said steam space, means in said separator tube for whirling the steam and water mixture upon upward passage through the tube whereby to separate a major portion of the water content against the tube wall for spilling over the wall's top edge into said water space and to allow the whirling mixture thus freed of the separated water to flow further upwardly from the tube's central portion, a plurality of annular troughs being adapted to receive washing water from the outside of said drum and arranged in substantially concentric and spaced relation to form steam risers therebetween said steam risers communicating with the outlet of said tube to allow the steam issuing therefrom to flow through said steam risers, overflow means for maintaining a substantial body of washing water within said troughs, a plurality of annular hoods spacedly arranged above said troughs and having sides downwardly extending into said troughs and adapted to force said steam flowing through said risers substantially below the level of said water body the sides of said hoods being perforated to divide the steam into fine streams bubbling through said body of washing water, an outlet for the overflow of washing water into the water space of said second chamber and means for discharging the washed stream through said steam outlet.

References Cited in the file of this patent
UNITED STATES PATENTS

| | | |
|---|---|---|
| 740,678 | Moore | Oct. 6, 1903 |
| 1,480,888 | Marshall | Jan. 15, 1924 |
| 2,070,067 | Rice | Feb. 9, 1937 |
| 2,238,824 | Ryner | Apr. 15, 1941 |
| 2,286,207 | Keenan et al. | June 16, 1942 |
| 2,380,424 | Frisch | July 31, 1945 |
| 2,424,212 | Andrews et al. | July 22, 1947 |
| 2,594,490 | Patterson | Apr. 29, 1952 |